Jan. 20, 1959  D. E. AUSTIN  2,869,615
VEHICLE SEAT
Original Filed March 27, 1953  5 Sheets-Sheet 1
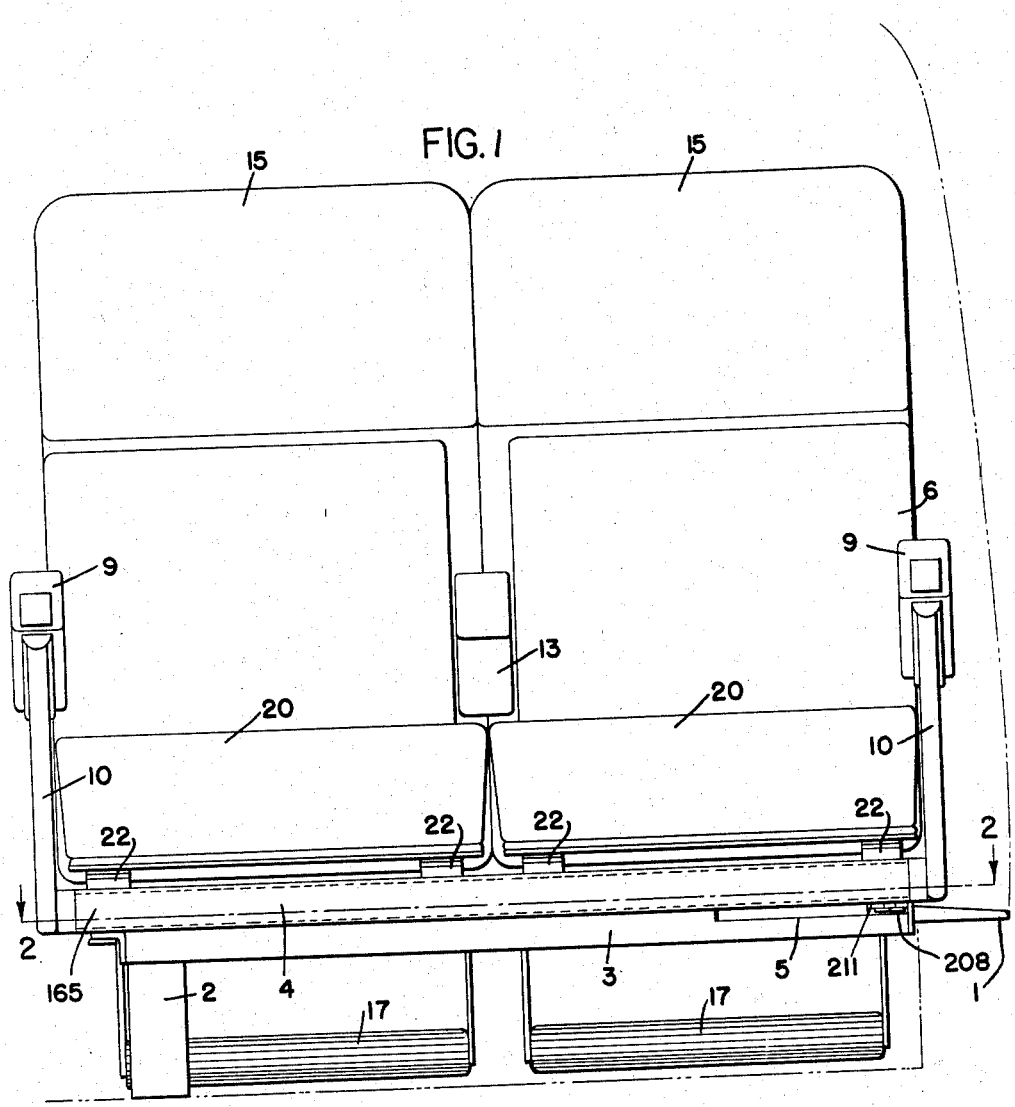
INVENTOR.
DWIGHT E. AUSTIN
BY
ATTORNEY

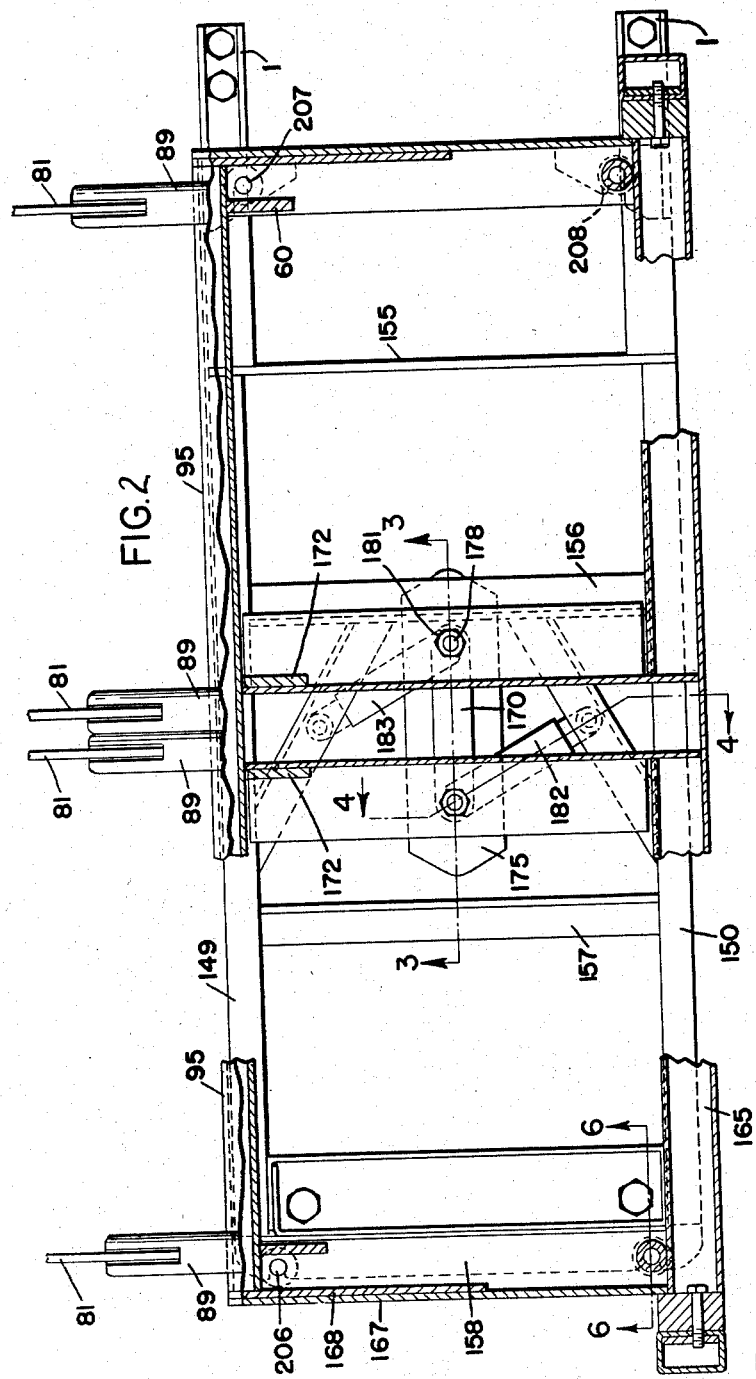

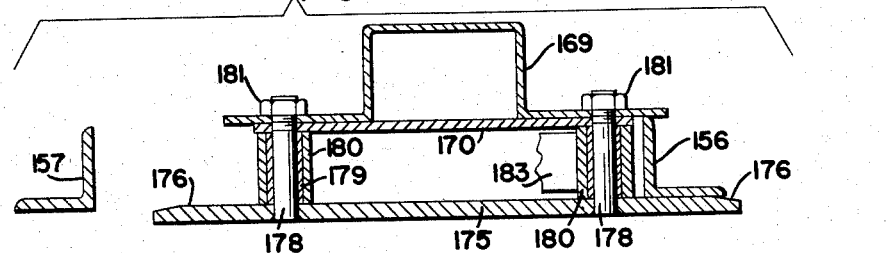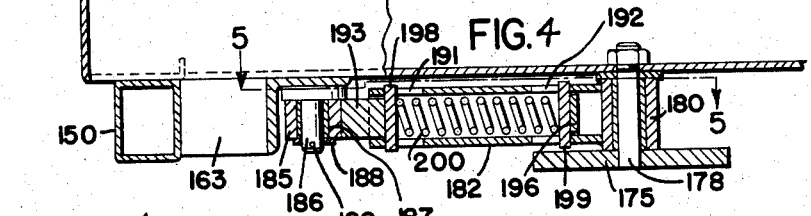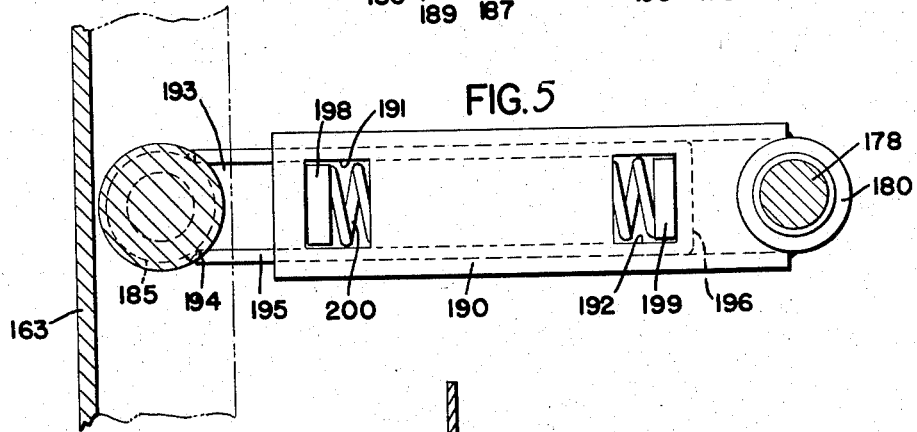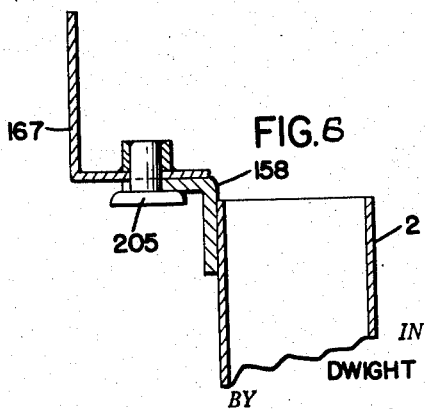
INVENTOR.
DWIGHT E. AUSTIN
BY
ATTORNEY

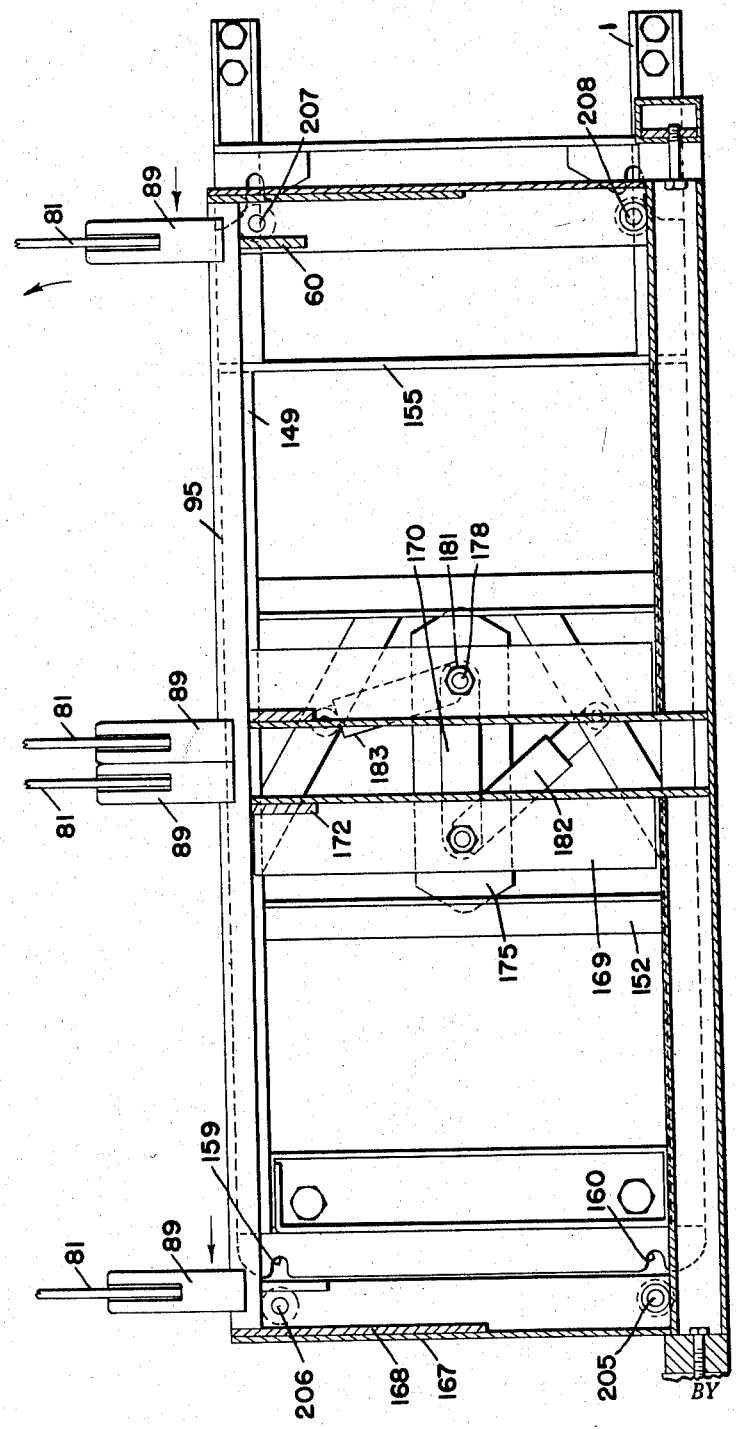

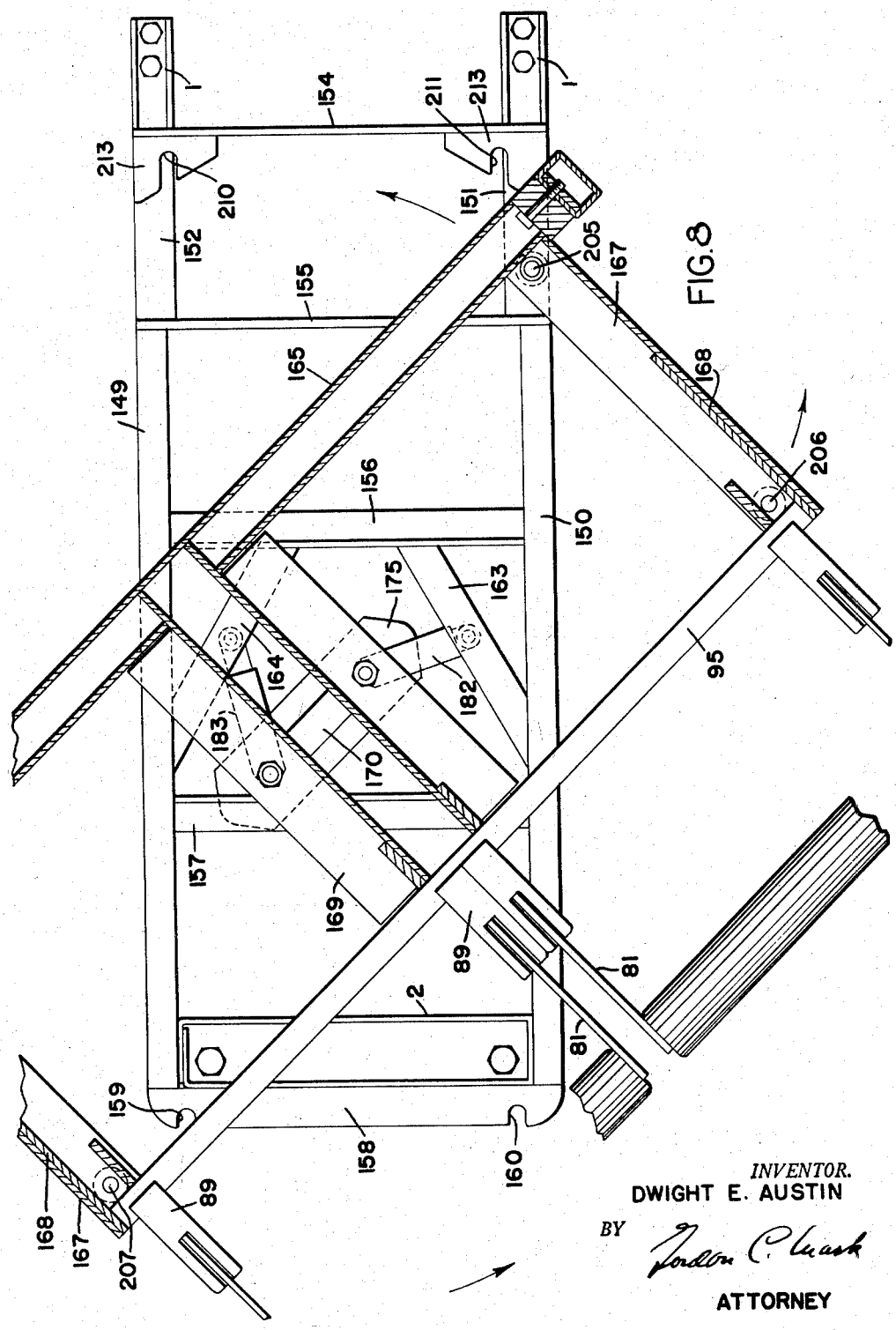

United States Patent Office 2,869,615
Patented Jan. 20, 1959

2,869,615

VEHICLE SEAT

Dwight Edwin Austin, Kent, Ohio

Original application March 27, 1953, Serial No. 344,980, now Patent No. 2,760,559, dated August 28, 1956. Divided and this application July 23, 1956, Serial No. 599,595

4 Claims. (Cl. 155—97)

This invention relates to a vehicle seat designed particularly for installation in a railroad car, although it may be used in other vehicles. The seat is preferably designed to hold two persons, but it may be designed to hold a single person or more than two persons.

The seat includes a fixed base upon which the upper portion is rotatable so that it may be faced in one direction when the vehicle is moving in that direction, and faced in the reverse direction when the vehicle is moving in the reverse direction. The reversing means includes extensible and compressible links which connect the fixed lower base and the rotatable upper base. These links permit the seat to be shifted inwardly, as toward the aisle of the railroad car when the seat is to be reversed. Locking means is provided which prevents rotation of the upper portion of the chair.

This application is a division of my application Serial No. 344,980 filed March 27, 1953, now U. S. 2,760,559.

The invention will be more fully explained in connection with the accompanying drawings, in which—

Fig. 1 is an elevation of the front of a double seat;

Fig. 2 is a view of the upper and lower base assembly on the line 15—15 of Fig. 1 with the base assemblies locked and the chair facing the bottom of the sheet;

Fig. 3 is a section through the central portion of the base assemblies on the line 16—16 of Fig. 2;

Fig. 4 is a detail of the ring mechanism and surrounding parts on the line 17—17 of Fig. 2; ;

Fig. 5 is a plan view of the link mechanism on the line 18—18 of Fig. 4;

Fig. 6 is a section through one unit of the locking mechanism on the line 19—19 of Fig. 2;

Fig. 7 is a view similar to Fig. 2 but with the upper base assembly shifted inwardly so that the locking mechanism disengaged, the extent of the shift being exaggerated to clarify the illustration, being actually only sufficient to disengage the locking mechanism; and Fig. 8 is a view similar to Figs. 2 and 7 but with the upper base assembly turned and almost in the reverse of the position shown in Figs. 15 and 20.

The drawings illustrate a chair in a railway car or the like with the left side fastened to the wall of the car by a bracket 1 and the opposite side of the chair supported on the pedestal 2. The bracket and pedestal support the lower base assembly 3. The upper base assembly 4 is reversibly supported on the lower base assembly 3. Assembly 3 is cut away at 5 to provide room for the locking mechanism when the assembly 4 is reversed. The seat backs 6 are pivotally supported at their lower ends and are held at a desired inclination by latching rods which extend backwardly from the arms 9. The fronts of the arms are held by the arm supports 10. The two arms 9 at the outside edges of the chair are similarly constructed and between the seats is the folding arm 13 which may be of any usual construction. The headrests 15 are pivotally supported at the tops of the backs 6. The footrests 17 are attached to the rear of the upper base assembly 4. The rears of the seat portions 20 are movably supported and the front portions are slidably supported on the buttons 22.

Figure 2 shows the upper base assembly 4 locked directly over the lower base assembly 3, parts of the upper base assembly being cut away to show the lower base. In Fig. 2 the front of the upper base assembly is at the bottom of the sheet and the back is at the top of the sheet as indicated by the housings 89 and footrest arms or supports 81.

In Fig. 7, as indicated by the arrows, the upper base assembly is shown in an exaggerated position, away from the wall of the vehicle, to clearly show the locking members disengaged. In Fig. 8 the upper base assembly has been revolved about the lower base assembly through almost a complete cycle of 180 degrees and the front of the upper base assembly is approaching the back of the lower base assembly. In order to rotate the upper base assembly about the lower base assembly the footrests must be raised. The shape of the arms of the footrest is such that the lower base raises them automatically as the upper base assembly is rotated. Stops prevent the upper base assembly from being revolved completely about the lower base assembly because the footrests and backs would interfere with the wall. However, the upper base assembly can be turned through 180 degrees and locked on the lower base assembly so that the seat faces in the reverse direction from what it faces in Fig. 2. The mechanism for doing this will now be explained.

The lower base member is formed with the back member 95 and a corresponding front member 150. Between the end members or brackets 1 and the front and back members 149 and 150 are the front and back center members 151 and 152. The cross members of the lower base are the plates 154 and 155 which form the first and second cross members, the angles 156 and 157 which form the third and fourth cross members, and the outside angle 158 which is slotted at 159 and 160, and forms the fifth cross member. There are two base members 163 and 164.

The upper base assembly is formed of the front channel 165, the rear tube 195, the end angles 167, and end angle reinforcements 168. At the center of the upper base assembly is the center hat section 169. In Figs. 2, 7 and 8 the upper portion of this is broken away in order to more clearly show the parts below it. Figure 3 shows a section through the complete center hat section 169 of the upper base assembly, and shows how it is welded to the rotary center strap 170 at its center. The central portion of the center hat section overlaps the front member 150 as shown in Figs. 2, 7 and 8, and its rear is supported by the plates 172 which are fastened to the rear tube 95. The hold-down plate 175 is used to hold the upper and lower base assemblies together during the rotation cycle and is located below the hat section, a distance equal to the height of the angles 156 and 157. The ends 176 of this hold-down plate are beveled slightly to facilitate turning them under the angles 156 and 157. The threaded studs 178 are welded to the hold-down plate on the centerline of the upper base equidistant from the front and rear thereof and extend upwardly through the rotary center strap 170 and the side flanges of the center hat section. The bearings 179 and bushings 180 surround these studs, and the parts are held in place by the nuts 181.

Connecting the upper and lower base assemblies are two telescoping links 182 and 183, which are both extensible and compressible. They are used for holding the assemblies together while pivoting the upper base assembly on the lower base assembly, and also for locking the seat in either the forward-facing or the rearward-facing position. The construction of the links will be described first, and then their functioning.

One end of each link is fastened to the upper base assembly through one of the bushings 180. The other end is fastened to a bushing 185 which is mounted on a shouldered stud 186 on the centerline lower base assembly equidistant from its ends. Bushing 185 is separated from stud 186 by bushing 187. The bushings are held in place by washers 188 and pins 189.

The outer housing 190 of each link is welded to the bushing 180. There is a rectangular opening 191 at the top and bottom of the housing at the end of the housing nearest the stud 186 and a rectangular opening 192 at the opposite end of the housing. The round lug 193 is welded to the bushing 185 and fits in the open end of the outer member or housing 190. The open ends 194 of the U-member 195 are fastened to the bushing 185 adjacent the round lug 193, and the closed end 196 of this U-member fits in the housing 190. The spring plate 198 fits in the opening 191 adjacent the round lug, and the spring plate 199 fits in the opening 192 near the closed end 196 of the U-member. The spring 200 is located between the spring plates and is under slight compression so that it presses the plates to the outer ends of the respective openings 191 and 192. A large button (not shown) is pressed into the center of each spring plate, and these buttons are faced toward the spring and enter its opposite ends, and hold the spring plates in position.

In an alternative construction, the lug 193 and U-member 195 are formed as a single piece with an opening therein extending from the outside edge of opening 191 to the outside edge of opening 192, with the spring 200 and spring plates located in this opening.

Simple locking means is provided to lock the upper base assembly in position over the lower base assembly. There are four buttons 205, 206, 207 and 208 which project downwardly from the four corners of the upper base assembly. There are four slots 160 and 159 in the outside angle iron 158, and 210 and 211 in the hold-down plates 213 of the lower base assembly. The four buttons are releasably engaged in these respective slots when the upper and lower assemblies are locked in position, as shown in Fig. 2. When the upper base assembly is reversed the buttons 205, 206, 207 and 208 are engaged in the slots 210, 211, 160 and 159, respectively. The slots 210 and 211 are in the hold-down plates 213 which are welded to the first cross member 154. Figure 6 shows the button 205 engaged in the slot 160 in the fifth cross member 158. In Fig. 1, the upper right-hand corner of the lower base assembly 3 is cut away to provide for rotation of the upper base assembly thereon without interference from the buttons.

The spring 200 in either link is compressed whenever the link is either shortened or lengthened. When the link is shortened, the outer edge of the opening 192 presses the spring plate 199 against the right end of the spring and compresses it. When the link is lengthened, the outer edge of the opening 191 presses the spring plate 198 against the other end of the spring and shortens it. Each spring tends to bring its link to the normal position shown in Fig. 4 in which the spring plates are pressed against the outer edges of their respective openings 191 and 192. Consequently, when the upper base assembly is locked above the lower base assembly (either as shown in Fig. 2 or with the upper base assembly faced in the opposite direction) the links are preferably in the normal position. This keeps the assemblies locked in this position, and prevents the upper base assembly from shifting toward the aisle and becoming unlocked. Some variation from this is possible, as for example by having one link somewhat extended and the other somewhat shortened, and some such variation may prove desirable.

To unlock the upper base assembly, so that it may be rotated, it is slid on the lower base assembly away from the wall until the buttons 205, 206, 207 and 208 are disengaged from the respective hold-down slots. To do this, one link must be extended and one must be shortened, and the spring in each is compressed. During rotation through 180 degrees the extended link is made shorter than normal and the shorter link is made longer than normal. When the seat has been reversed, both springs are compressed, and in extending to normal position (Fig. 4) the upper base assembly is forced to the wall and the buttons are locked in the hold-down slots.

One of the ends of the hold-down plate is always engaged under one of the cross members 156 and 157. Figure 7 shows the two ends engaged under the respective cross members. In Fig. 2 one end of the hold-down plate is engaged under one cross member, and in Fig. 8 it is engaged under the other cross member. The hold-down plate prevents the upper base assembly from being lifted off of the lower base assembly. The spring links maintain the two assemblies in the proper relative positions toward one another regardless of the stage of the reversal of the seat. Figure 8 shows the reversal of the upper base assembly as almost complete, and when it is completed the front and back members of the upper base assembly will be immediately above the front and back members of the lower base assembly, and the two assemblies will then be locked by engaging the buttons in the slots as previously explained. The springs in the links prevent the assemblies from becoming unlocked by unintentional disengagement of the buttons from the slots because this would necessitate increasing the compression of the springs. This can only be done by intentionally pulling the upper base assembly outwardly from the wall of the vehicle.

The back of the seat is pivotally supported on the back supports 60 (Figs. 2 and 7).

The drawings are illustrative. The invention is covered in the claims which follow.

What I claim is:

1. A vehicle seat mounted on an upper base, a lower base on which the upper base is rotatable, two links each pivoted at one of its ends to the centerline of one of said bases equidistant from the ends thereof and also equidistant from the actual center thereof, said links extending in opposite directions from said centerline of that base with their opposite ends pivotally fastened to the centerline of the other base equidistant from the front and rear thereof, each link being formed of two end sections with spring means tending to hold the links at a neutral length and each link being extensible to a greater length and compressible to a shorter length, the two bases being provided with means for locking the upper base against rotation about the lower base.

2. A vehicle seat mounted on an upper base, a lower base on which the upper base is rotatable, two links each pivoted at one of its ends to the centerline of one of said bases equidistant from the ends thereof and also equidistant from the actual center thereof, said links extending in opposite directions from said centerline of that base with their opposite ends pivotally fastened to the centerline of the other base equidistant from the front and rear thereof, each link being formed of two end sections with a spring tending to hold the links at a neutral length and each link being extensible to a greater length and compressible to a shorter length, the two bases being provided respectively with notches and pins interlocked, all of the notches opening toward one end of the upper base whereby the upper base is rotatable on the lower base when the pins and notches are disengaged and not rotatable when they are engaged.

3. The vehicle seat of claim 2 in which the notches are all on the lower base and the pins project downwardly from the upper base.

4. The vehicle seat of claim 2 in which the two links are pivoted at one end to the centerline of the lower base between the ends thereof.

References Cited in the file of this patent

UNITED STATES PATENTS

| | | |
|---|---|---|
| 1,826,532 | Small | Oct. 6, 1931 |
| 2,095,561 | Bell | Oct. 12, 1937 |
| 2,154,600 | Bell | Apr. 18, 1939 |
| 2,472,349 | Smith | June 7, 1949 |

FOREIGN PATENTS

| 499,513 | Great Birtain | Jan. 25, 1939 |
|---|---|---|